(12) United States Patent
Cofrin

(10) Patent No.: US 7,803,098 B2
(45) Date of Patent: Sep. 28, 2010

(54) HANDLEBAR ASSEMBLY FOR PUSH APPARATUS

(76) Inventor: Michael Cofrin, 320 E. Main St., Anoka, MN (US) 55303

( * ) Notice: Subject to any disclaimer, the term of this patent is extended or adjusted under 35 U.S.C. 154(b) by 167 days.

(21) Appl. No.: 11/503,862

(22) Filed: Aug. 14, 2006

(65) Prior Publication Data

US 2007/0037668 A1 Feb. 15, 2007

Related U.S. Application Data

(60) Provisional application No. 60/816,395, filed on Jun. 23, 2006, provisional application No. 60/707,649, filed on Aug. 12, 2005.

(51) Int. Cl.
*A63B 23/00* (2006.01)
(52) U.S. Cl. .............. 482/148; 56/229; 16/437
(58) Field of Classification Search .......... 482/148, 482/126; D15/14; 56/229, 16.7; 16/437; 280/47.11, 47.38; 172/21; D12/128
See application file for complete search history.

(56) References Cited

U.S. PATENT DOCUMENTS

| 2,266,165 | A | * | 12/1941 | Clemson | 56/249 |
|---|---|---|---|---|---|
| 3,044,239 | A | * | 7/1962 | Harkness | 56/12.8 |
| 4,455,816 | A | * | 6/1984 | Porath | 56/249 |
| RE32,202 | E | * | 7/1986 | Cody et al. | 56/11.3 |
| 4,653,255 | A | * | 3/1987 | O'Brien et al. | 56/249 |
| 4,922,694 | A | * | 5/1990 | Emoto | 56/16.7 |
| 5,274,987 | A | * | 1/1994 | Wiener | 56/14.8 |
| 5,297,379 | A | * | 3/1994 | Smith | 56/11.8 |
| 5,542,689 | A | * | 8/1996 | Chalfant | 280/242.1 |
| 5,913,802 | A | * | 6/1999 | Mullet et al. | 56/10.8 |
| 6,102,022 | A | * | 8/2000 | Schave | 125/13.01 |
| 6,116,350 | A | * | 9/2000 | Notaras et al. | 172/15 |
| 6,769,501 | B2 | * | 8/2004 | Iida et al. | 180/19.3 |
| 6,848,523 | B2 | * | 2/2005 | Ishikawa et al. | 180/19.3 |
| 7,188,849 | B2 | * | 3/2007 | Lee | 280/87.021 |
| 2002/0152647 | A1 | * | 10/2002 | Hanafusa et al. | 37/251 |
| 2004/0227330 | A1 | * | 11/2004 | Everett | 280/642 |
| 2006/0202056 | A1 | * | 9/2006 | Hancock | 239/147 |
| 2009/0286654 | A1 | * | 11/2009 | Rice | 482/4 |

\* cited by examiner

*Primary Examiner*—Lori Baker
(74) *Attorney, Agent, or Firm*—Patterson Thuente Christensen Pedersen, P.A.

(57) ABSTRACT

A handlebar assembly and related methods for utilizing the handlebar assembly with a push apparatus. The handlebar assembly includes handlebars pivotally mounted to a support frame, which in turn is coupled to the push apparatus. The handlebar assembly can be utilized with a variety of different push apparatus including either user propelled or self-propelled push lawnmowers. The handlebar assembly can incorporate additional user control features such as a hand operated throttle control or brake assembly. Through the use of the handle bar assembly, the push apparatus can be propelled or otherwise directed in a continuous motion such that stopping and pivoting movements are not required to change the operating direction of the push apparatus. The handlebar assembly allows for an increase in exercise intensity while simultaneously providing improved turning control to the push apparatus.

5 Claims, 13 Drawing Sheets

HANDLEBAR ASSEMBLY FOR PUSH APPARATUS

PRIORITY CLAIM

The present invention claims priority to U.S. Provisional Application Ser. Nos. 60/707,649 filed Aug. 12, 2005, entitled "HANDLEBAR ASSEMBLY FOR PUSH APPARATUS" and 60/816,395 filed Jun. 23, 2006, entitled "HANDLEBAR ASSEMBLY FOR PUSH APPARATUS", both of which are herein incorporated by reference in their entirety.

FIELD OF INVENTION

The present invention relates generally to a handlebar assembly. More particularly, the invention relates to a pivoting handlebar assembly for use with a push apparatus.

BACKGROUND OF INVENTION

In today's fast-paced society, it is often times difficult to find time to exercise during the day. In addition, the job force has become increasingly sedentary. Sedentary jobs, such as, for example, desk jobs, provide little or no physical activity during the course of the day. In addition, ordinary household chores, such as, for example, mowing the lawn, that were once a source of physical activity and exercise, have been made less strenuous with the introduction of self-propelled machines.

There exists a need to combine exercise with everyday activities to promote a more active, healthier lifestyle. One representative example of combining exercise with everyday activities is found in U.S. Pat. No. 5,893,817 to Morgan, which is directed to a lawn mower with an exercise computer and display providing the user the ability to monitor heart rate, calories burned, and other vital statistics while mowing the lawn. It is further desirable to increase the intensity of exercise associated with everyday activities.

In addition, current lawn mower designs utilize handle designs that are not conducive to easy turning and control. Generally, turning conventional lawn mowers, especially along sharp curves or at the end of a mowing row requires the user to stop and pivot the lawnmower around its wheels. This not only requires the user to stop but also requires the mower deck to be lifted which can result in unsafe exposure of the cutting blades.

SUMMARY OF THE INVENTION

The present invention is directed to a handlebar assembly for a push apparatus that is not only particularly suited for increasing exercise intensity of everyday activities involving push apparatus such as, for example, lawn mowers, strollers, shopping carts, and the like but furthermore, provides improved turning control to the push apparatus.

In one aspect, the handlebar assembly generally comprises handlebars pivotally mounted to a support frame. A pivot assembly is located on the handlebars, which can provide frictional resistance to movement of the handlebars and allowing continuous motion of the push assembly. A horizontal support beam can be located along the support frame to provide additional support to the frame as well as providing a location to add extra weight to the push apparatus for increased exercise.

In addition to providing the health benefits associated with exercise, another aspect of the present invention includes additional user benefits provided by the handlebar assembly including the ability to operate push-equipment in areas where a radiused turn is appropriate or which limit the available turning radius.

In yet another aspect, the present invention comprises a method for operating a push apparatus with continuous motion such that stopping and pivoting movements are not required to change the operating direction of the push apparatus.

In yet another aspect, the present invention comprises a handlebar assembly incorporating control features for operating a self-propelled walk behind lawn mower. The handlebar assembly can include representative controls such as, for example, throttle controls and/or brake controls.

In yet another aspect, a handlebar assembly of the present invention can be incorporated with a manual or self-propelled mower deck to provide an improved handling lawnmower. In one embodiment, the handlebar assembly can be attached to a push reel style mower deck. Alternatively, the handlebar assembly can include throttle and/or braking controls allowing the user to selectively control the travel and cutting speed of a self-propelled mower deck.

Figure 1:
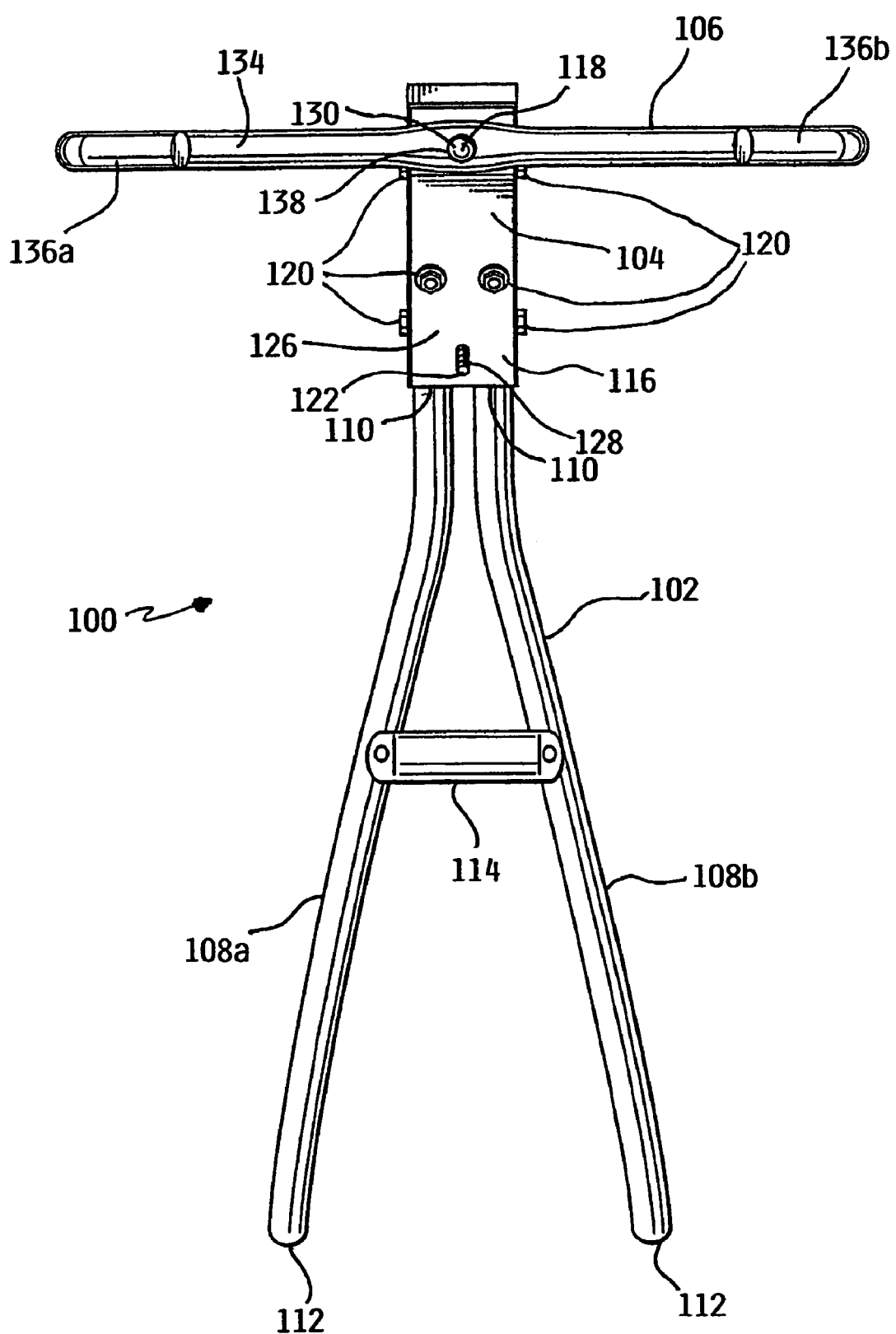
FIG. 1 is a front view of an embodiment of a handlebar assembly of the present invention.

While the invention is amenable to various modifications and alternative forms, specifics thereof have been shown by way of example in the figures and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

The embodiments of the invention described below are not intended to be exhaustive or to limit the invention to the precise forms disclosed in the following detailed description. Rather, the embodiments are chosen and described so that others skilled in the art may appreciate and understand the principles and practices of the invention.

As illustrated in FIGS. 1, 2, 3, 4 and 5, a first embodiment of a handlebar assembly 100 for use with a push apparatus can comprise a support frame 102, a pivot assembly 104, and a handlebar member 106. Handlebar assembly 100 can be fabricated and operably joined using suitable methods of fabrication including the use of appropriate fasteners, welding, molding and combinations thereof. Handlebar assembly 100 can further comprise suitable materials of construction such as, for example, metals including carbon steel and aluminum, plastic polymers, wood and combinations thereof. Depending upon the style and function of the push apparatus, handlebar assembly 100 can be fabricated to have desirable properties including, for example, being a lightweight design, a heavy-duty design or having desirable aesthetic properties.

Referring to FIGS. 1-5, support frame 102 can comprise two side support members 108a and 108b, though it is envisioned that support frame 102 could also comprise a single or additional side support members depending upon the use and function of the push apparatus. Side support members 108a, 108b can each comprise a handlebar attachment end 110 and a push apparatus attachment end 112. Support frame 102 can also comprise at least one horizontal beam 114 connecting the side support members 108a, 108b to provide strength and rigidity to the support frame 102.

Figure 2:
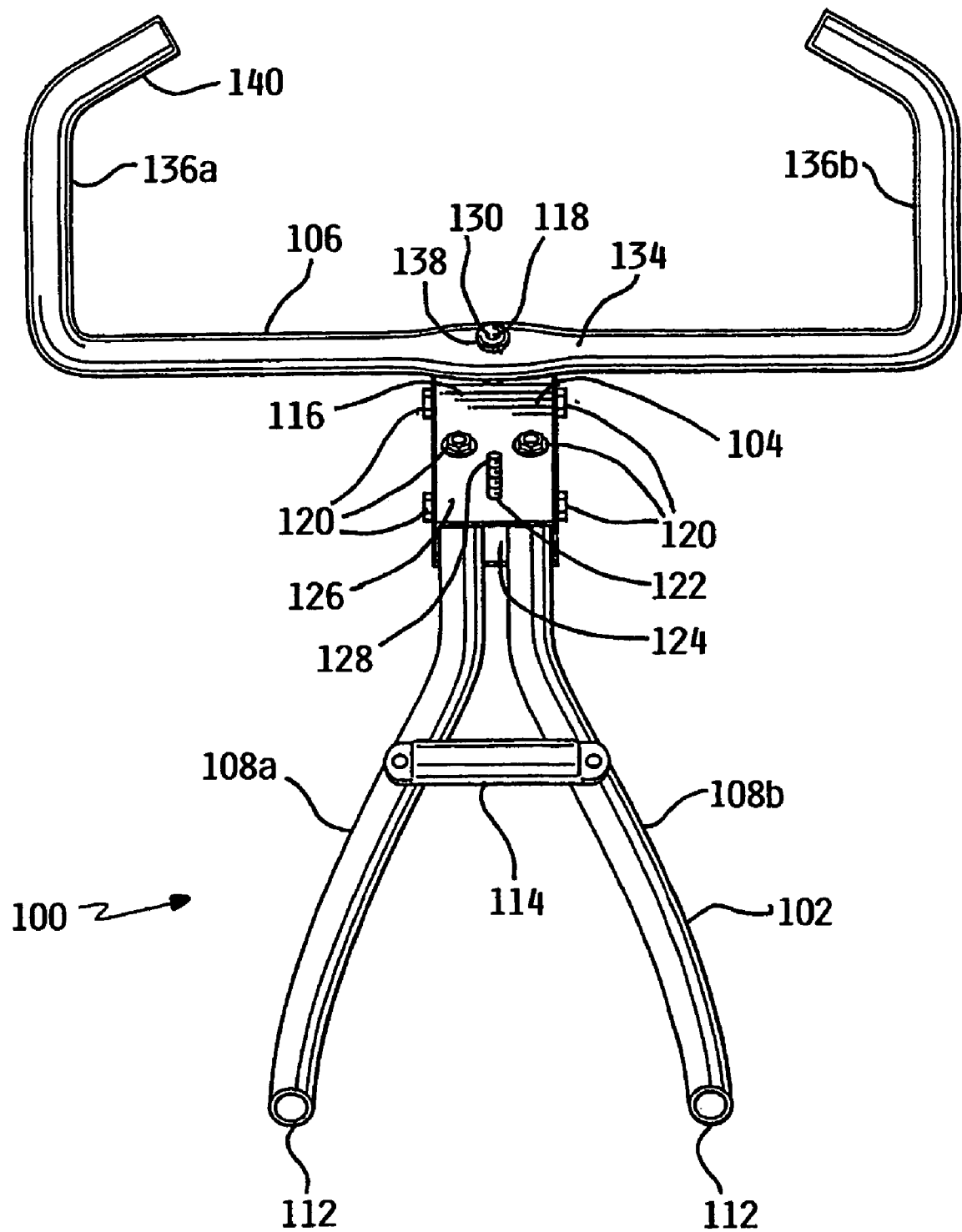
FIG. 2 is a front, perspective view of the handlebar assembly of FIG. 1.
Figure 5:
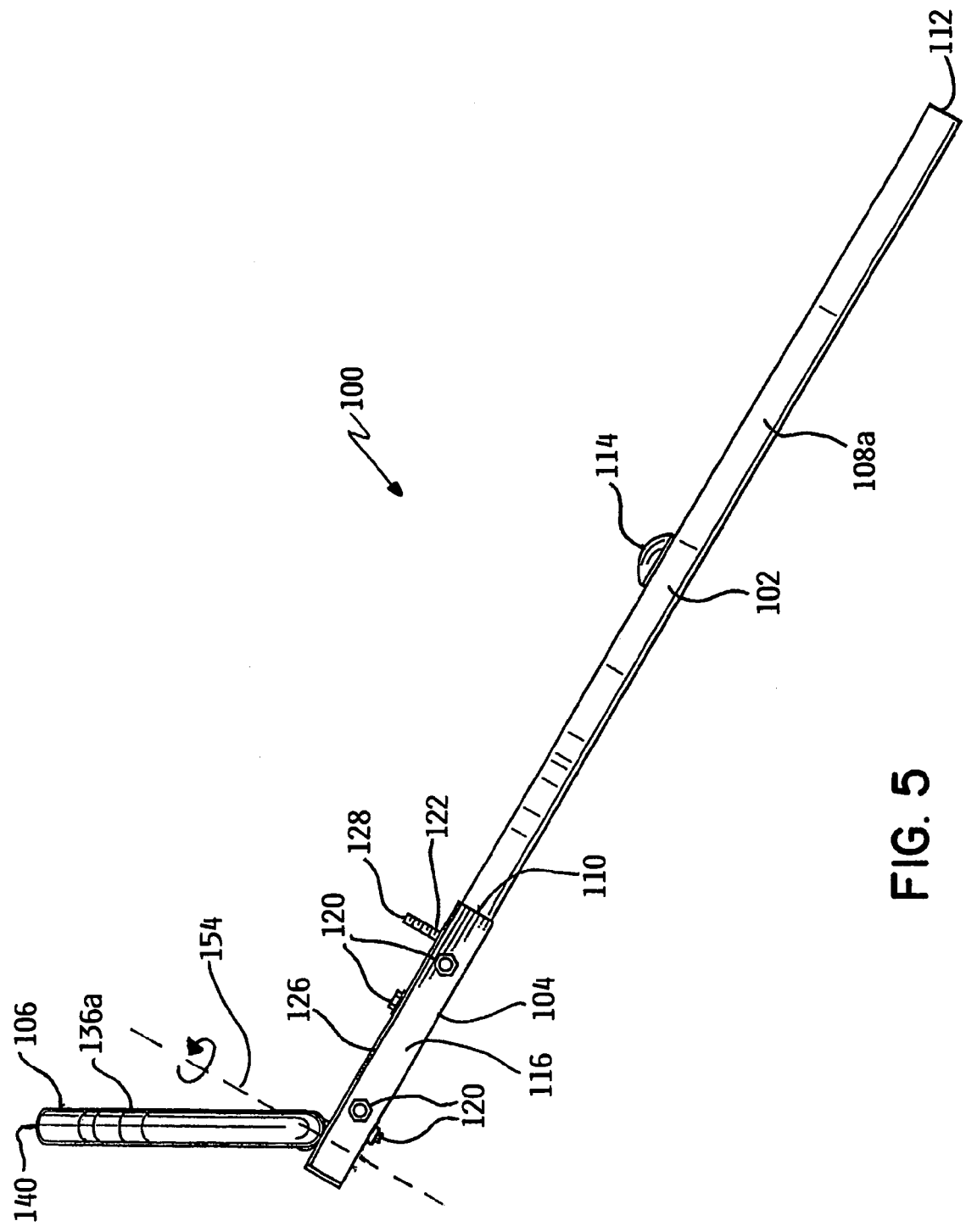
FIG. 5 is a side view of the handlebar assembly of FIG. 1.
Figure 12:
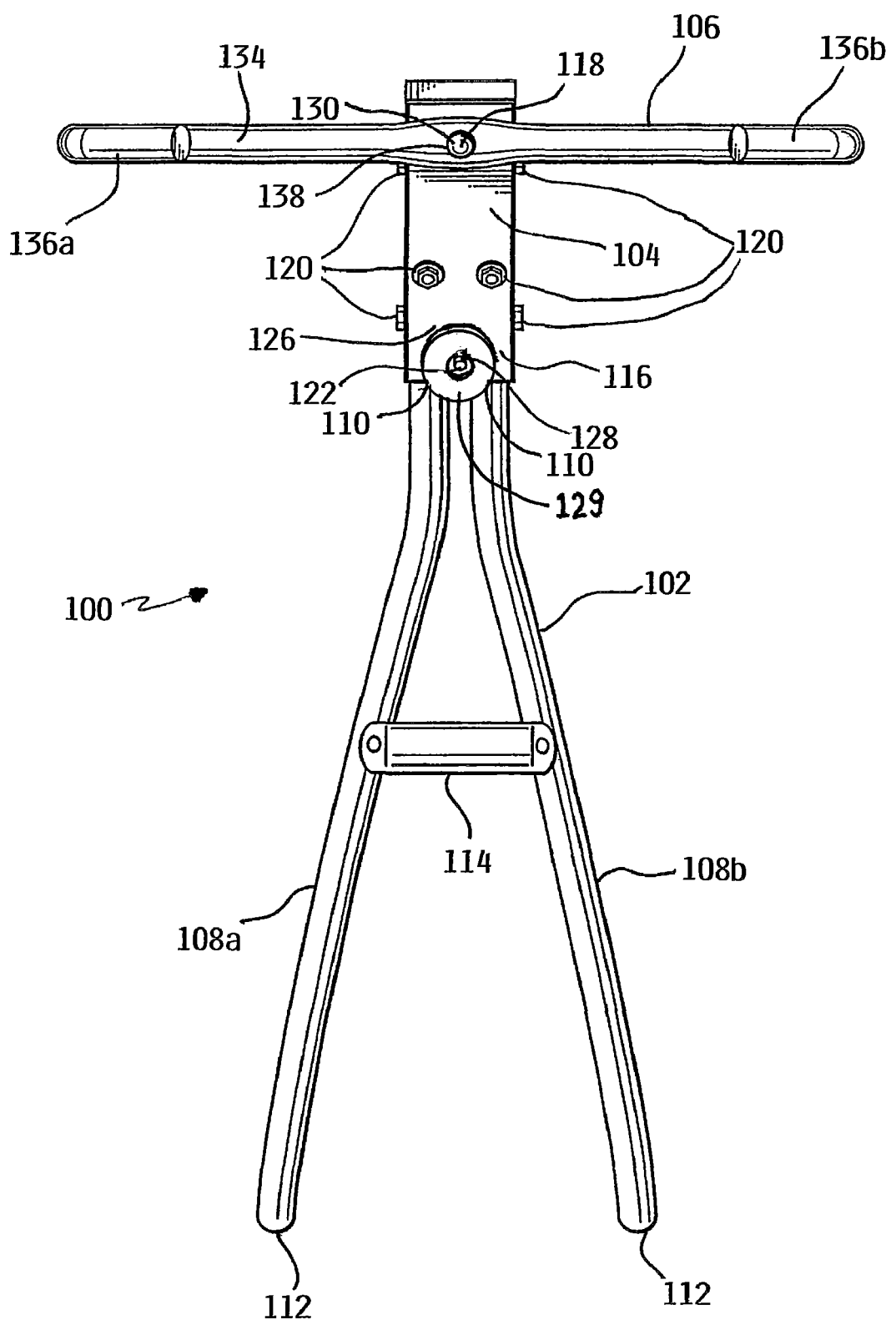
FIG. 12 is a front view of the handlebar assembly of FIG. 1 including a free weight placed over a center post on a support frame.
Figure 13:
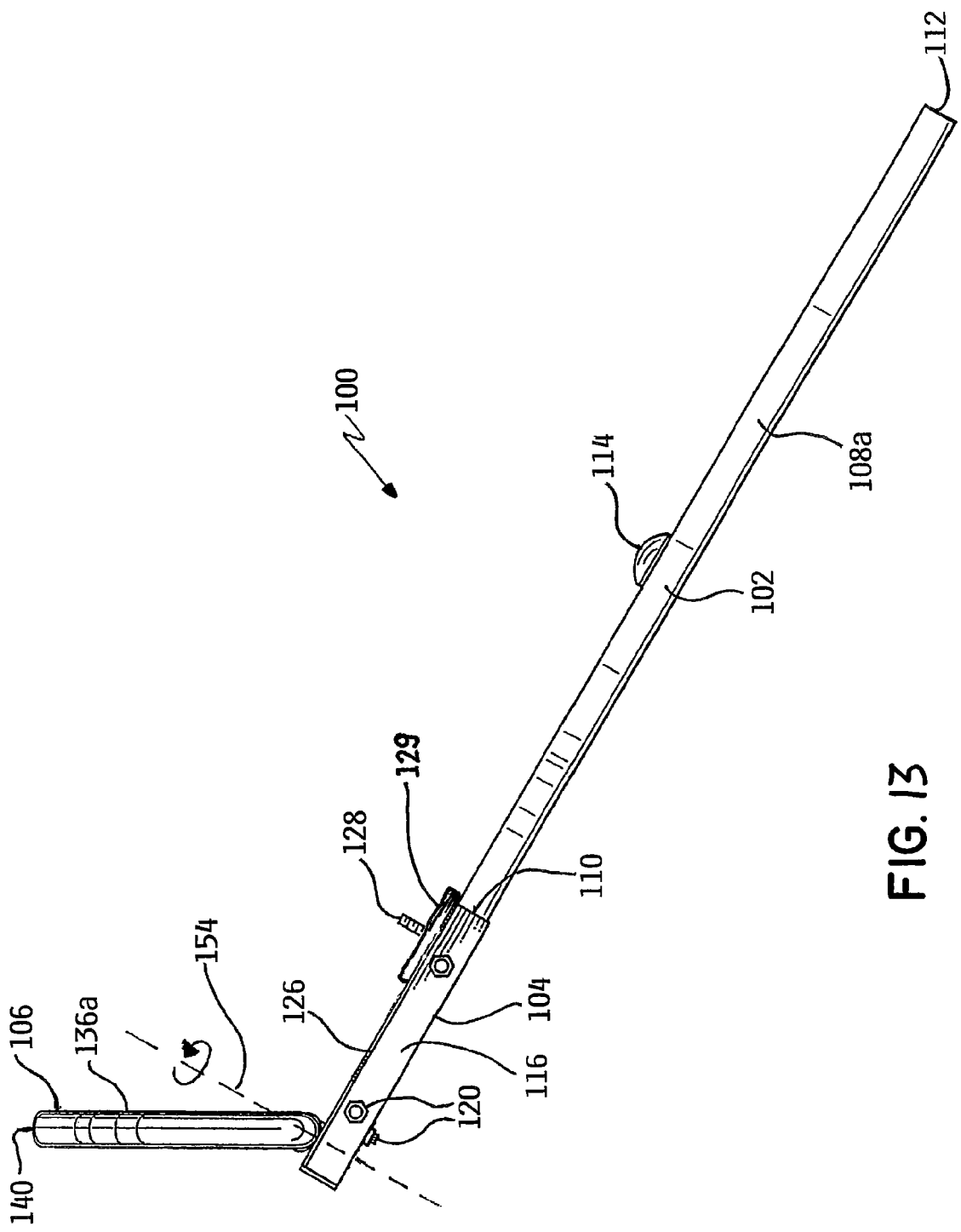
FIG. 13 is a side view of the handlebar assembly and free weight of FIG. 12.

Pivot assembly 104 can comprise a connecting box 116, a pivot member 118, a plurality of connecting members 120 and an exercise feature 122. Connecting box 116 generally defines an open interior portion 124 sized so as to accommodate the placement of handlebar attachment ends 110. Using connecting members 120, the handlebar attachment ends 110 can be connected and fixed within the open interior portion 124 so as to operably join the pivot assembly 104 and the support frame 102. Exercise feature 122 can be fixed to a top surface 126 of the connecting box 116 so as to enhance the exercise experience of a user utilizing the handlebar assembly 100. Representative exercise feature 122 can comprise a center post 128 as seen in FIGS. 1, 2, and 5 for placing and retaining free weights 129 as shown in FIGS. 12 and 13. In other representative embodiments, exercise feature 122 can one or more of a towel holder, a drink holder, and the like. Pivot member 118 can comprise a pivot insertion member 130 such as, for example, a screw or bolt, and a pivot connecting member such as, for example, a nut located within the connecting box 116. Pivot assembly 104 can further comprise one or more bearing members adapted for use with pivot member 118.

Figure 3:
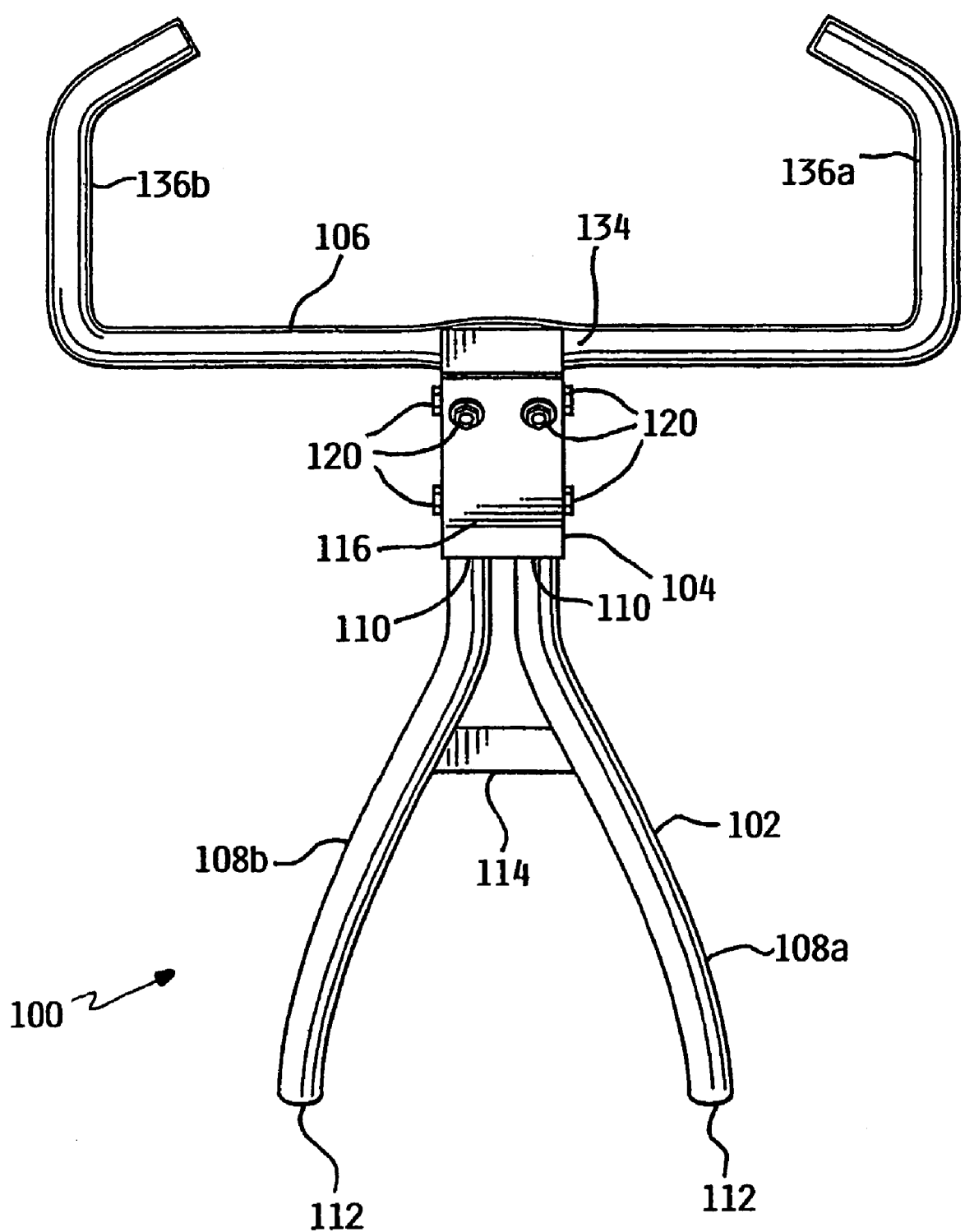
FIG. 3 is a rear view of the handlebar assembly of FIG. 1.
Figure 4:
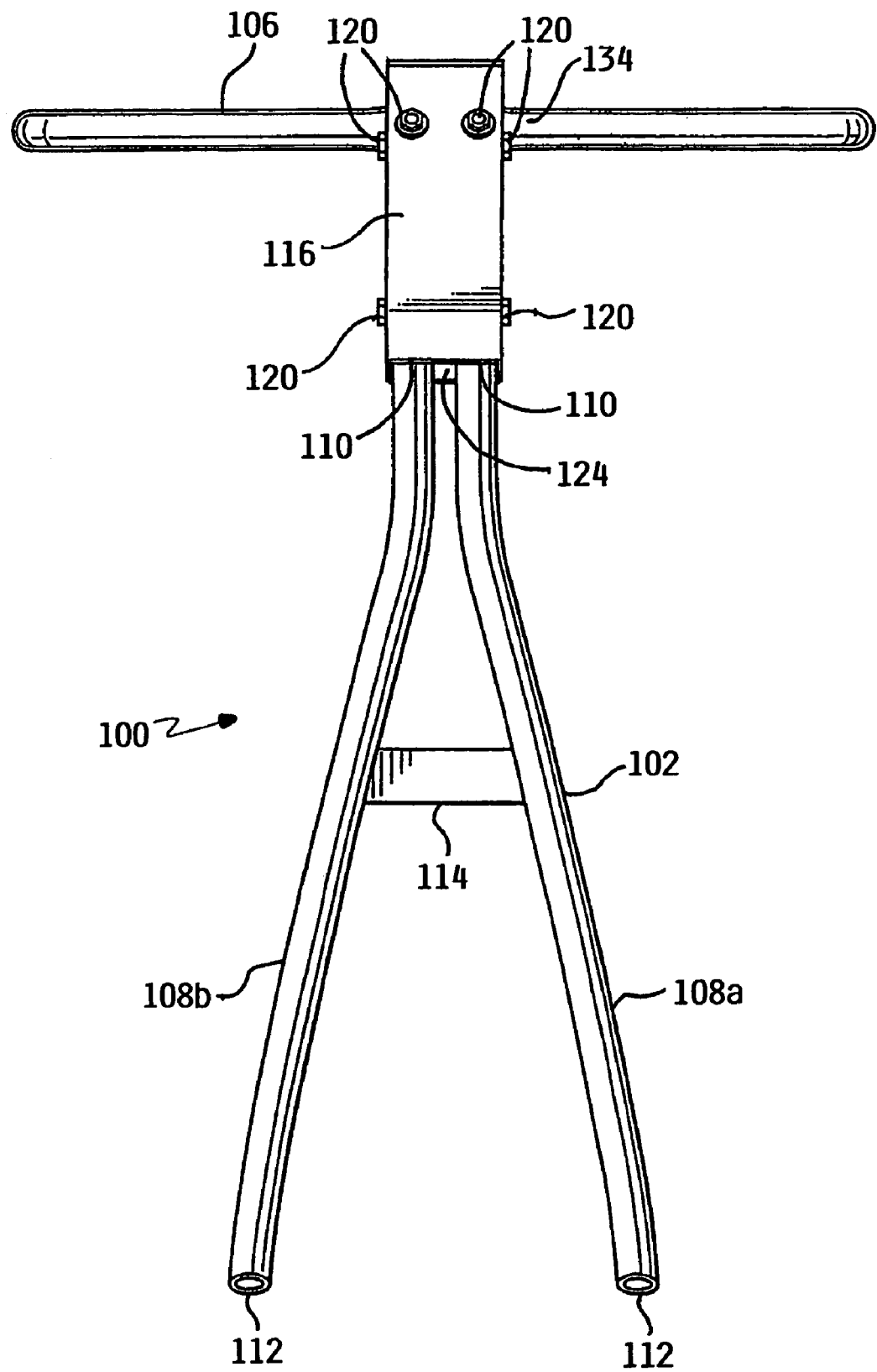
FIG. 4 is a rear, perspective view of the handlebar assembly of FIG. 1.

Handlebar member 106 can comprise a center member 134 and a pair of gripping members 136a, 136b. Center member 134 can include a pivot bore 138 for accommodating slidable insertion of pivot insertion member 130. Using pivot insertion member 130 and pivot connecting member 132, handlebar member 104 can be pivotally connected to the pivot assembly 104 and correspondingly, the support frame 102. Handlebar member 104 can be fabricated in a variety of configurations such that gripping members 136a, 136b are arranged in a vertically upward configuration 140 as illustrated in FIGS. 3, 4 and 4 or alternatively, a straight-horizontal configuration or a vertically downward configuration. In some embodiments, gripping members 136a, 136b can be adjustably attached to the center member 134 such that the gripping members 136a, 136b can be rotatably adjusted to any configuration between a vertically downward configuration and a vertically upward configuration.

Figure 6:
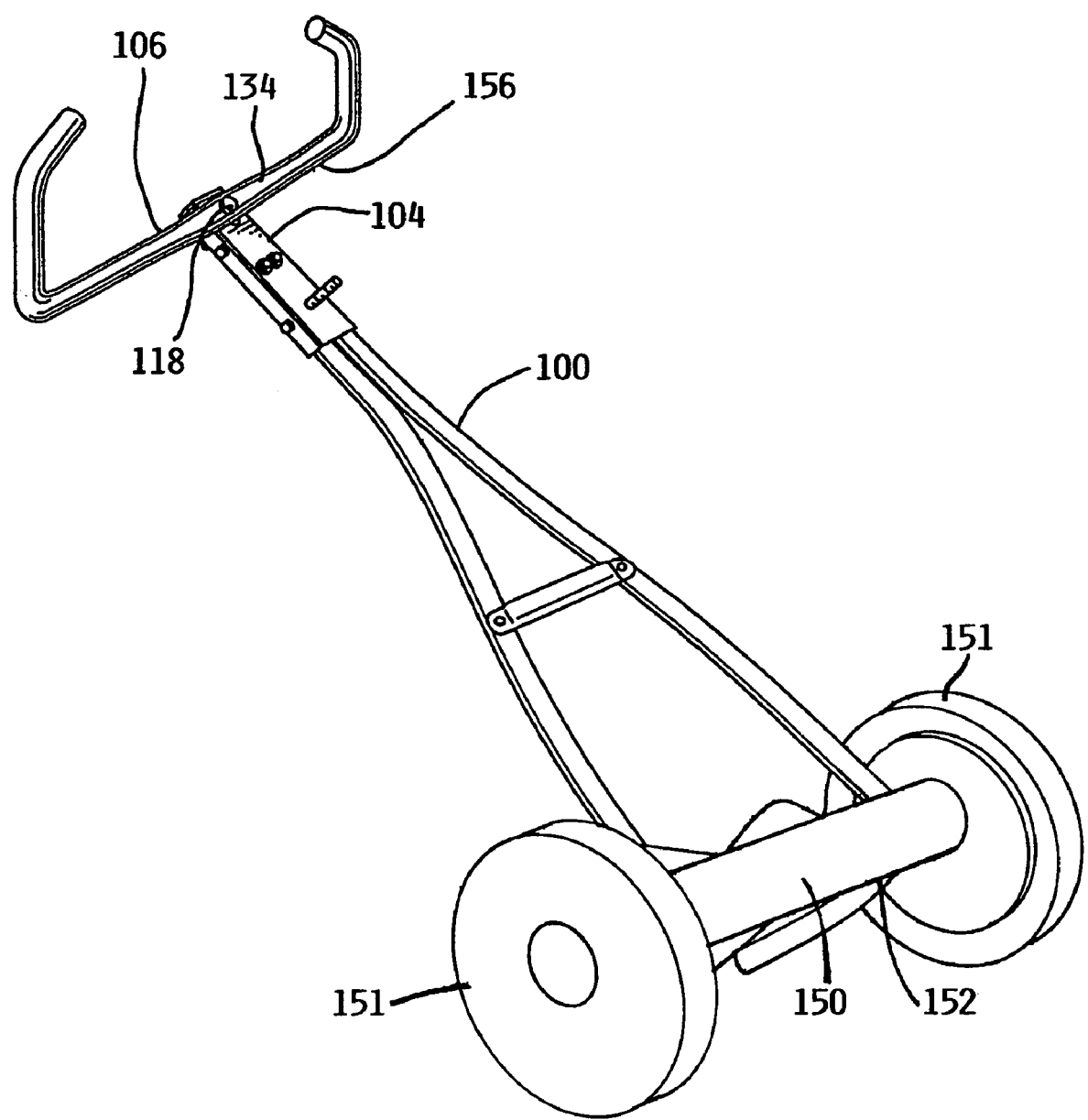
FIG. 6 is a front, perspective view of the handlebar assembly of FIG. 1 operably coupled to a push apparatus.

As illustrated in FIG. 6, handlebar assembly 100 can be operably connected to a push apparatus 150. Push apparatus 150 can comprise a manual push reel mower deck 152 as seen in FIG. 6 or any of variety of suitable push apparatus including, for example, a baby stroller, a running stroller, a shopping cart, a wagon, and the like. Manual push reel mower deck 152 can comprise suitable push reel designs such as, for example, designs sold under the Task Force, Great States, Scott's and American Lawn Mower brand names. Push apparatus 150 will generally comprise at least two wheels 151 for advancing the push apparatus 150 is a desired path of travel. Side support members 108a, 108b can be secured to the push apparatus 150 with an appropriate mounting method including for example, the use of a nut and bolt configuration or other suitable mounting means.

Figure 7:
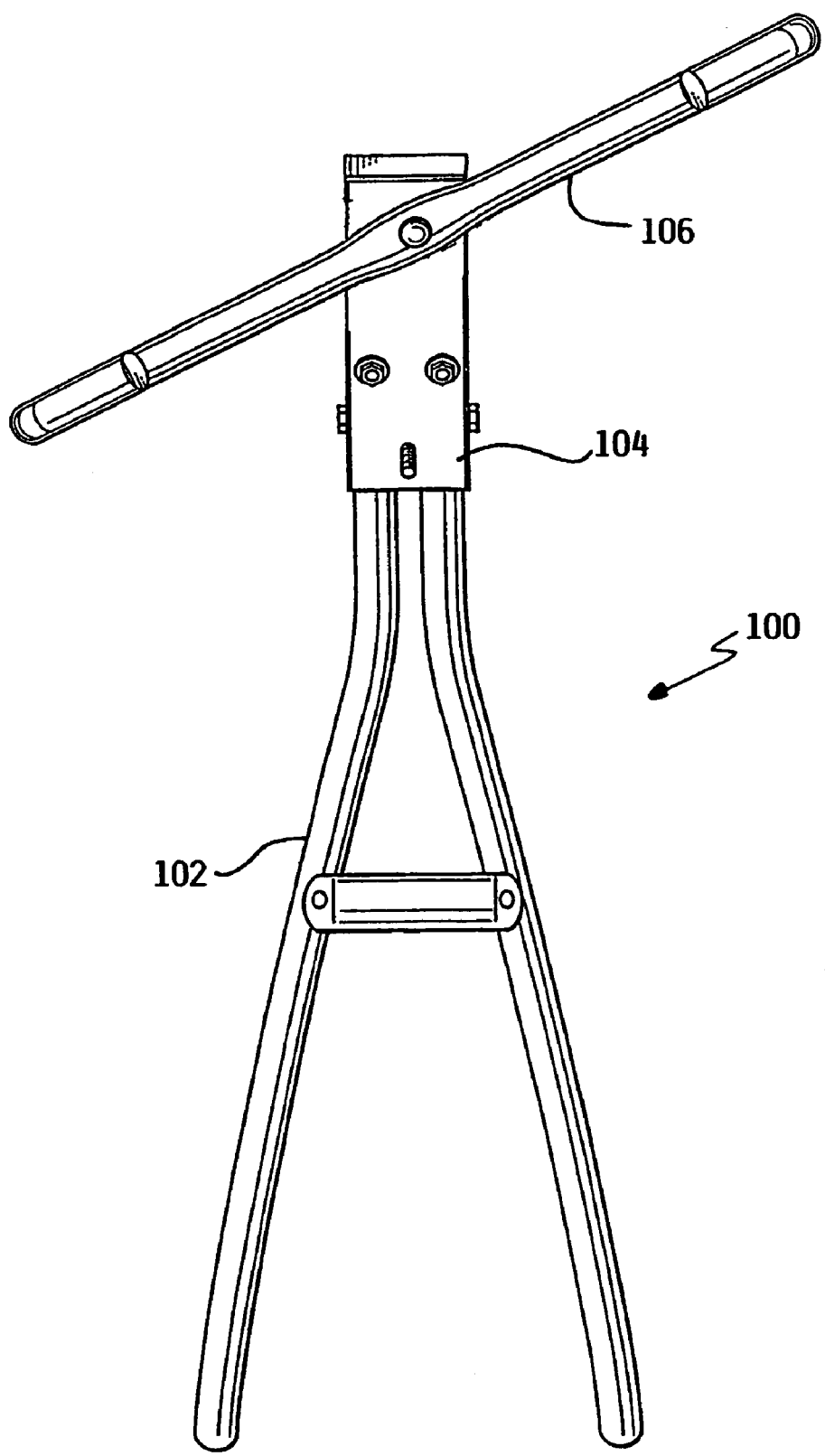
FIG. 7 is a front view of the handlebar assembly of FIG. 1 with a handlebar member pivotally rotated around a pivot member.
Figure 8:
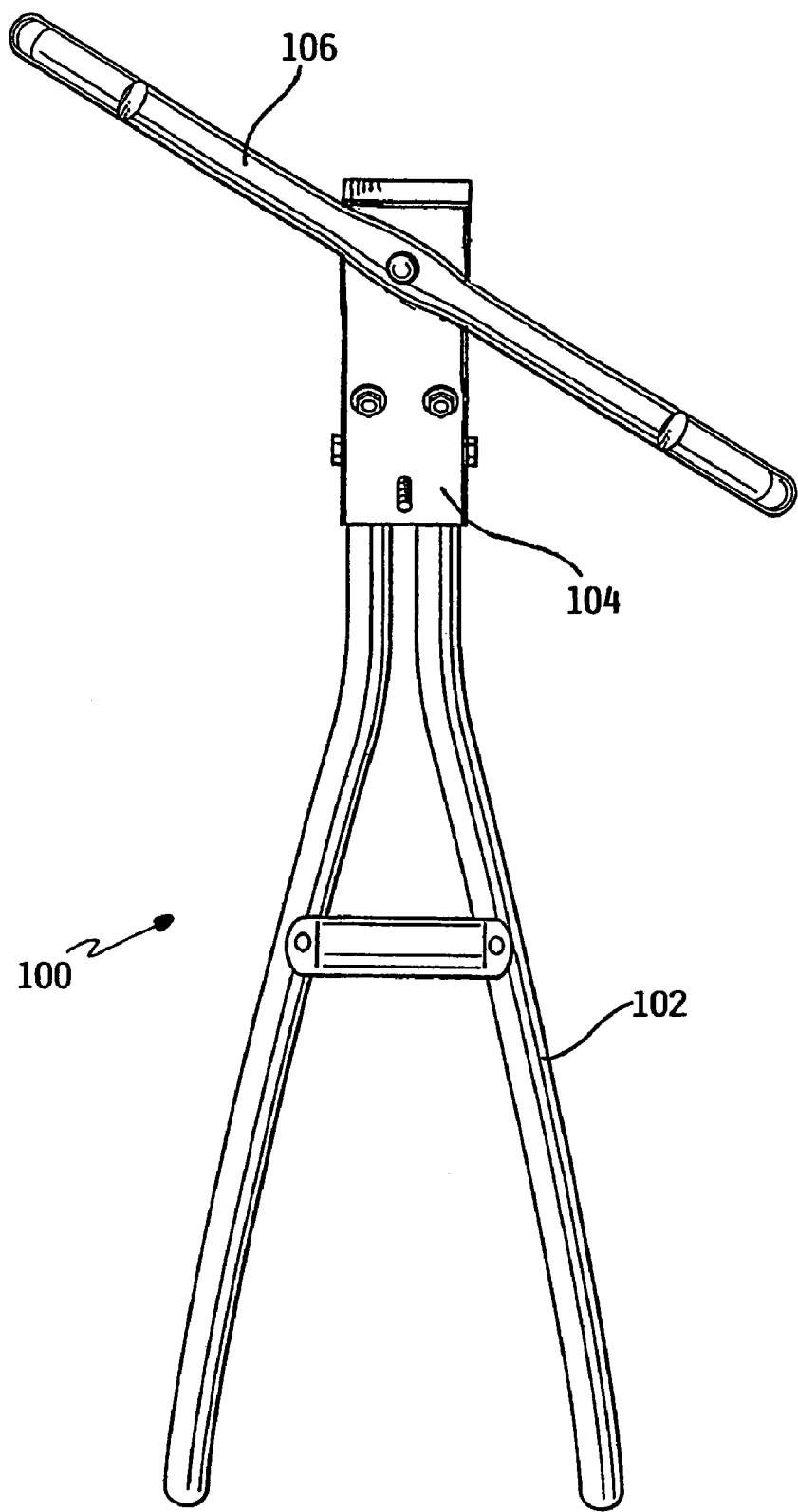
FIG. 8 is a front view of the handlebar assembly of FIG. 1 with a handlebar member pivotally rotated around a pivot member.
Figure 9:
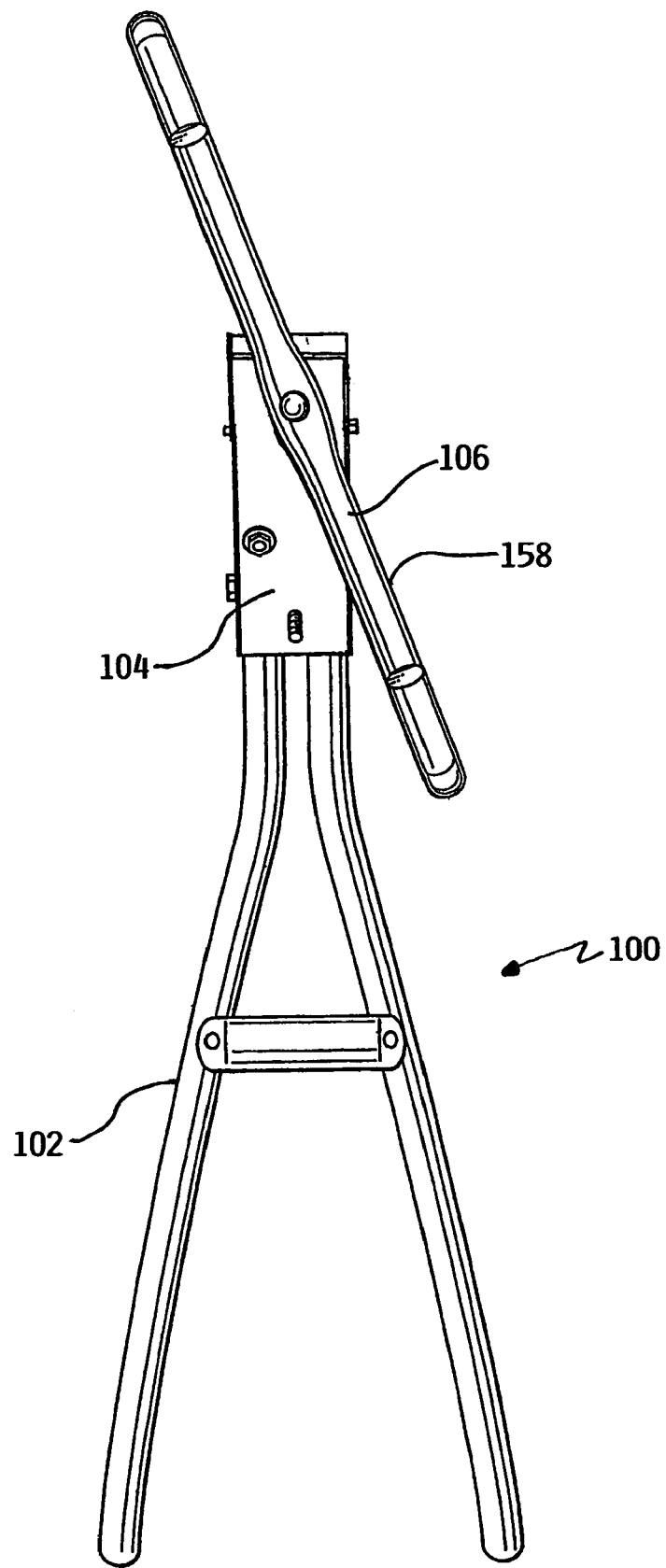
FIG. 9 is a front view of the handlebar assembly of FIG. 1 with a handlebar member pivotally rotated to a substantially parallel configuration with respect to a support frame.

Handlebar member 106 rotatably interacts with pivot assembly 104 to provide rotatable pivoting of center member 134 around the pivot member 118 which generally defines a rotation axis 154 perpendicular to support frame 102 as indicated in FIG. 5. As illustrated in FIGS. 1-6, handlebar member 106 is residing a substantially perpendicular position 156 with respect to support frame 102. Referring to FIGS. 7, 8 and 9, handlebar member 106 is shown rotatably pivoted around rotation axis 154 including a substantially parallel position 158 in FIG. 9.

FIGS. 7-9 illustrate the relative positions of the handlebar assembly 100 as would be used to direct push apparatus 150. Referring to FIGS. 1-6, handlebar member 106 is oriented in a substantially perpendicular position 156 to the support frame 102, which results in push apparatus 150 moving in a generally straight path. In order to increase exercise activity and promote increased control of the push apparatus 150, it is desirable to continuously push the push apparatus 150 without pausing to change directions, such as, for example, at corners, ends of a row, or to avoid obstructions. Referring to FIGS. 8 and 9, upon pivoting handlebar member 106 about rotation axis 154, push apparatus 150 responds accordingly by continuously rotating in the direction of the pivoting/rotating motion of the handlebar member 150. Using handlebar assembly 100, push apparatus 150 can be turned with a turning radius of substantially zero. For example, when a user directs handlebar member 106 is rotated in a counterclockwise direction with respect to rotation axis 154, push apparatus 150 correspondingly turns to the left in a continuous motion. Therefore, there is no need for the user to stop and manually tilt and pivot push apparatus 150 around stationary wheels and the user never break their stride.

Referring to FIG. 9, handlebar member 106 is rotated to substantially parallel position 158 for maximum resistance and increased push apparatus length. By rotating handlebar member 106 to substantially parallel position 158, the push apparatus 150 can be directed into difficult to reach areas, such as, for example, under overhanging leaves and between bushes and shrubs.

Handlebar assembly 100 when used in combination with push apparatus 150 permits continuous movement and turning of push apparatus 150, therefore increasing the intensity of exercise and activity associated with everyday activities. As such, aerobic activity is maintained for the duration of use of the push apparatus 150. Aerobic activity can be adjusted and/or increased through the addition of free weights 129 mounted over center post 128 to selectively increase or decrease the effort required to advance the push apparatus 150. In addition, the pivoting relation between handlebar member 106 and support frame 102 allows a user to continually direct push apparatus 150 in a radial orientation such as, for example, around trees or to conform with arcuate features such as, for example, landscaping, driveways and sidewalks.

As illustrated in FIG. 6, handlebar assembly 100 is operably coupled to a manual push reel mower deck 152 however, alternative mowers, such as gas, electric, self-propelled, and the like are suitable mowers for use with handlebar assembly 100. In one embodiment of the invention, push apparatus 150 can be mounted to casters to provide for zero turning radius and continuous movement of the pushing apparatus for enhanced exercise activity.

Figure 10:
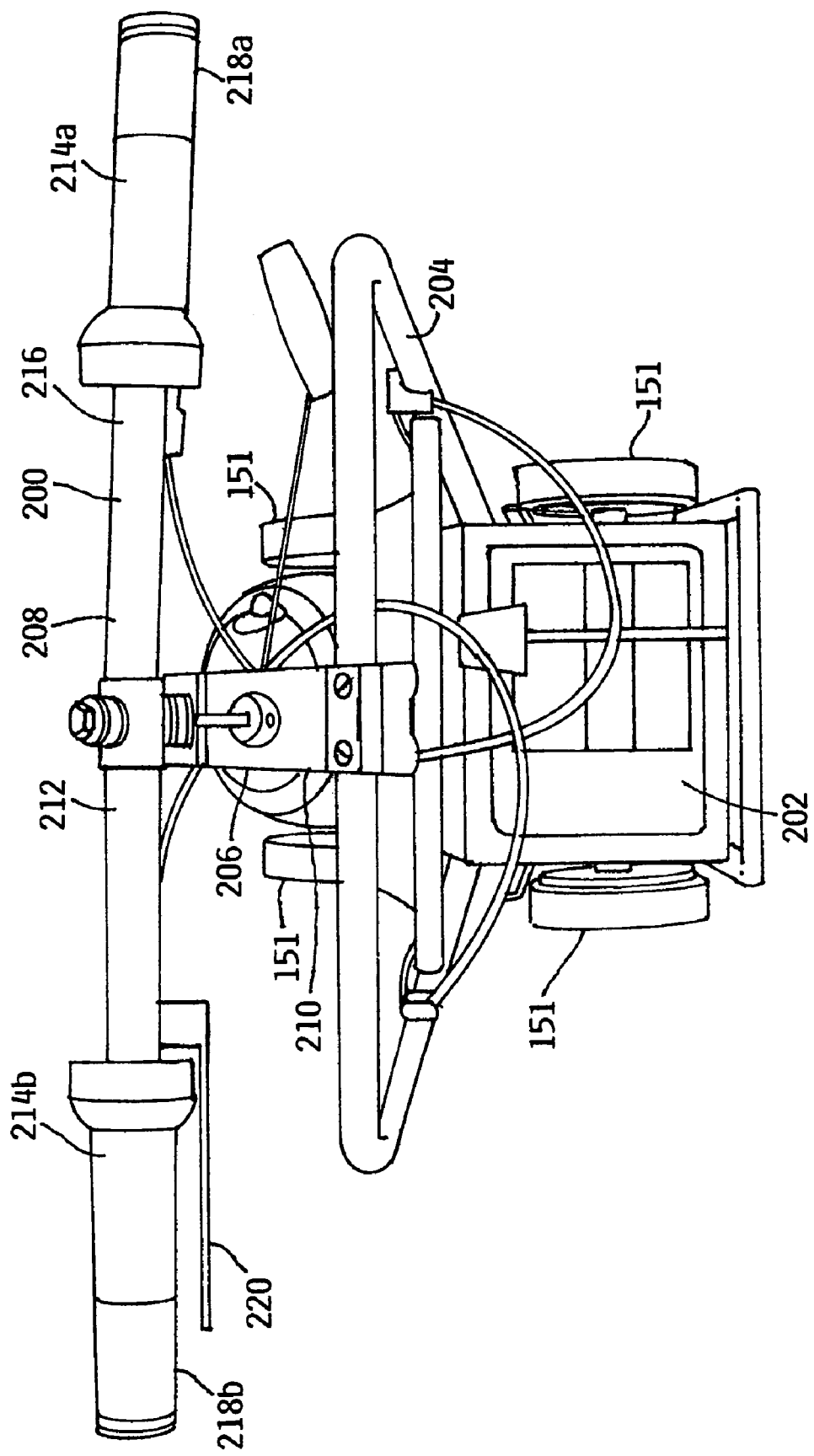
FIG. 10 is a rear view of an embodiment of a handlebar assembly of the present invention operably coupled to a self-propelled mower deck.
Figure 11:
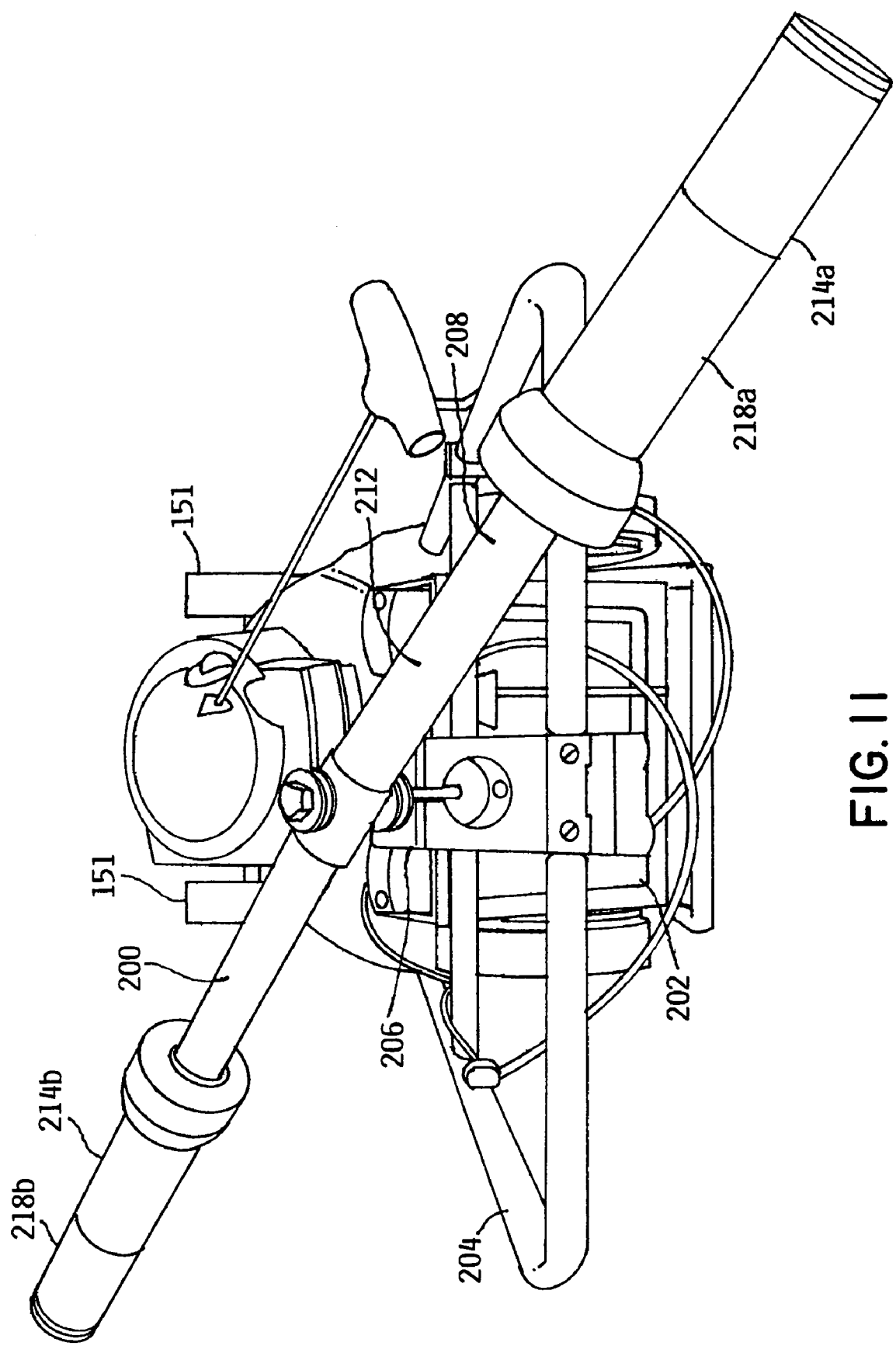
FIG. 11 is a rear, perspective view of the handlebar assembly of FIG. 10 operably coupled to the self-propelled mower deck.

As illustrated in FIGS. 10 and 11, another embodiment of a handlebar assembly 200 is operably attached to a self-propelled, walk behind lawn mower deck 202. Self-propelled, walk behind lawn mower deck 202 can comprise any of the various models commercially available under brand names such as, for example, Toro, Lawn-Boy, Black & Decker, Yard Machines and Troy-Bilt. Self-propelled, walk behind lawn mower deck 202 generally comprises four wheels 151, wherein at least one of the wheels is driven by a motor on the self-propelled, walk behind lawn mower deck 202. As the self-propelled, walk behind lawn mower deck 202 is propelled along a path of travel under its own power, the use of handlebar assembly 200 can improved maneuverability as a user navigates natural the natural curvature found in lawns and landscaping while also providing an ability to direct self-propelled, walk behind lawn mower deck 202 in essentially 180° U-turns without stopping and/or pivoting the self-propelled, walk behind mower deck 202 around wheels 151.

Referring to FIGS. 10 and 11, handlebar assembly 200 can resemble handlebar assembly 100 in that handlebar assembly 200 also includes a support frame 204, a pivot assembly 206 and a handlebar member 208. Support frame 204 and pivot assembly 206 can substantially resemble support frame 102 and pivot assembly 204. Alternatively, support frame 204 can take the form of a traditional handle structure for a lawn mower as shown in FIGS. 10 and 11, while pivot assembly 206 can comprise a detachable member 210 allowing the handlebar assembly 200 to take the form of a retrofit kit for use with traditional, existing lawn mowers.

Similar to handlebar member 106, handlebar member 208 comprises a center member 212 and a pair of gripping members 214a, 214b. Referring to FIGS. 10 and 11, handlebar member 208 is arranged in a straight configuration 216 as opposed to the upturned configuration of handle bar member 106. In order to provide forward control of the self-propelled, walk behind mower deck 202, gripping members 214a, 214b can include one or more hand throttles operably linked to the motor and/or transmission/clutch assembly. A cutting speed throttle 218a can be used to vary the cutting speed of a cutting blade depending upon thickness and/or length of grass being cut while a forward speed throttle 218b can be used to speed up or slow down the forward speed of the wheels 151. The hand throttles can comprise a ratcheting design wherein the hand throttle is twistably rotated to a desired throttle setting wherein it remains until adjusted. Alternatively, the hand throttles can be spring-loaded so at required the user to continually rotatably adjust and hold the throttle in position and wherein release of the hand throttle allows the throttle to rotate backwards and in some instance, cause the motor to stop. To promote added safety, gripping members 214a, 214b can also incorporate a hand brake 220 for slowing/stopping the wheels 151 and can also include a dead-man lever that must be constantly depressed for the motor to run. In some embodiments, the hand throttles can further include a transmission features allowing the transmission to be adjusted between forward and reverse directions.

Handlebar assembly 200 can provide features and benefits that are especially advantageous when used with self-propelled, walk behind lawn mower deck 202. With handlebar assembly 200, a user is able to keep both hands on the handlebar member 208 at all times to maintain control. With handlebar member 208 and the throttle/braking controls on gripping members 214a, 214b, control can be continuously applied through turns where a user would typically remove a hand or pivot a conventional lawnmower around its wheels. In addition, the position of the throttle/braking controls provides for easy forward control of the self-propelled, walk behind lawn mower deck 202 when speed changes are desired such as, for example, on hills, around curves, in proximity to landscaping features and at the end of a mowing row. Due to the control and turning advantages provided by handlebar assembly 200, snowblowers, garden tillers and other similarly self-propelled apparatus can also benefit from the use of handlebar assembly 200. In addition, handlebar member 208 including the cutting speed throttle 218a and forward speed throttle 218b can be used without the pivot assembly 206 such that the handlebar member 208 is in a substantially rigid orientation.

Although the present invention has been described with respect to a representative, presently contemplated embodiment, it will be understood that numerous insubstantial changes in configuration, arrangement or appearance of the elements of the present invention can be made without departing from the intended scope of the present invention. Accordingly, it is intended that the scope of the present invention be determined by the claims as set forth.

What is claimed is:

1. A method for directing a push apparatus along a path of travel comprising:
    providing a pivoting handlebar assembly for operable attachment to a push apparatus, the pivoting handlebar assembly including a support frame and a pivoting handlebar mounted to the support frame such that the pivoting handlebar is rotatable about a pivot axis having a perpendicular orientation to the support frame;
    steering the push apparatus along a travel path by rotating the pivoting handlebar assembly around the pivot axis;
    pushing the push apparatus to advance the push apparatus along the travel path; and
    adjusting an aerobic input necessary for pushing the push apparatus along the travel path by selectively adding or removing one or more free weights to or from a center post on the pivoting handlebar assembly.

2. A manual push mower comprising:
    a push reel mower deck having two wheels; and
    a pivoting handlebar assembly operably attached to the push reel mower deck, the pivoting handlebar assembly including a support frame and a pivoting handlebar rotatably mounted to the support frame such that the pivoting handlebar is rotatable about a pivot axis having a perpendicular orientation to the support frame as defined by one or more support arms forming the support frame wherein the push apparatus is steerable without lifting the two wheels and wherein the pivoting handlebar assembly further includes a center post for adding or removing one or more free weights to adjust an aerobic input necessary to operate the manual push mower.

3. The push apparatus of claim 1, wherein the pivoting handlebar includes a center member and a pair of gripping members, wherein the gripping members are arranged in an upward configuration or a straight configuration with respect to the center member.

4. A lawnmower comprising:

a push reel mower deck having at least two wheels; and a handlebar assembly operably attached to the push reel mower deck, the handlebar assembly including a support frame and a pivoting handlebar, the support frame including a pair of support arms, wherein the pivoting handler is rotatably mounted to the support frame such that the pivoting handlebar is rotatable about a pivot axis having a perpendicular orientation to the support frame as defined by the support arms, wherein the push reel mower deck is steerable without lifting the two wheel, the handlebar assembly including a center post for adding or removing one or more free weights to selectively change a push force required to propel the manually propelled mower deck.

5. The lawnmower of claim 4, wherein the pivoting handlebar includes a center member and a pair of gripping members, wherein the gripping members are arranged in an upward configuration or a straight configuration with respect to the center member.

* * * * *